US005402568A

United States Patent [19]
Hara

[11] Patent Number: 5,402,568

[45] Date of Patent: Apr. 4, 1995

[54] METHOD OF SECURING A TIP IN A TAPPET

[75] Inventor: Nobuo Hara, Fujisawa, Japan

[73] Assignee: Fuji Oozx Inc., Japan

[21] Appl. No.: 37,897

[22] Filed: Mar. 26, 1993

[30] Foreign Application Priority Data

| | | | |
|---|---|---|---|
| Jul. 31, 1992 | [JP] | Japan | 4-223574 |
| Oct. 7, 1992 | [JP] | Japan | 4-291948 |
| Oct. 7, 1992 | [JP] | Japan | 4-291960 |

[51] Int. Cl.[6] .......... B23P 15/00

[52] U.S. Cl. .......... 29/890.043; 29/890.046

[58] Field of Search .......... 29/888.43, 888.46, 523; 123/90.51

[56] References Cited

U.S. PATENT DOCUMENTS

| | | | |
|---|---|---|---|
| 1,402,226 | 1/1922 | Germonprez | 29/888.43 |
| 1,691,778 | 11/1928 | McDonald | 29/888.43 |
| 1,973,855 | 9/1934 | Long | 29/888.43 |
| 3,431,896 | 3/1969 | Giulietti | 29/888.43 |
| 4,477,714 | 10/1984 | Zorn et al. | 29/888.43 |
| 4,907,330 | 3/1990 | Akao et al. | 29/888.43 |

FOREIGN PATENT DOCUMENTS

| | | |
|---|---|---|
| 63-147907 | 7/1986 | Japan . |
| 63-38602 | 8/1986 | Japan . |
| 1-103703 | 12/1987 | Japan . |

*Primary Examiner*—Irene Cuda

*Attorney, Agent, or Firm*—Zarley, McKee, Thomte, Voorhees & Sease

[57] ABSTRACT

In a tappet for use in an internal combustion engine, a tip is fitted in an engage bore between the top wall of the tappet and an engine valve shaft. The tip has a chamfered portion over which a circumferential projection is pressed by a punch so as to fix the tip in the engage bore firmly. A caulking groove is formed by the punch around the engage bore on the top wall. Owing to the chamfered portion of the tip, a cracking is prevented at the bottom of the groove.

8 Claims, 5 Drawing Sheets

METHOD OF SECURING A TIP IN A TAPPET

BACKGROUND OF THE INVENTION

The present invention relates to a method of securing a tip in a tappet, and particularly, to a method of securing a wear-resistant metal tip between an engine valve shaft and the top wall of the tappet of a direct-acting valve operating mechanism in an internal combustion engine.

Recently, in order to increase allowable maximum speed and maximum brake power in an internal combustion engine, a DOHC-type valve operating mechanism has been used. In order to make the valve operating mechanism lightened, a tappet (valve lifter) in the valve operating mechanism has been made of an aluminium alloy instead of conventional steel.

Such aluminium alloy tappets have strength, rigidity and wear resistance lower than steel tappets, so that wear resistant metal is applied between a rotary cam and an axial end of an engine valve.

FIG. 10 illustrates a known tappet in a direct-acting valve operating mechanism. The numeral 101 denotes a cylinder head which a tappet body 102 slidably contacts, the tappet being a cylinder the upper surface of which is closed. A circular wear resistant plate 105 made of wear resistant metal fits in a larger diameter circular recess 104 on the upper surface of a top wall 103, and a smaller diameter tip 107 made of wear resistant metal fits in an engage bore 106 on the lower surface of the top wall 103. The lower surface of the tip 107 contacts the axial end of an engine valve connected to a cylinder head 101 by a pair of opposing cotters 108 and 108; a spring retainer 109 which hold the cotters; and a valve spring 110 for urging the spring retainer 109 upwardly. A rotary cam 112 disposed substantially above the axis of the engine valve slidably contacts the upper surface of the wear resistant plate 105.

To fix the tip 107 in the engage bore 106 of the tappet 102, there is a known method as shown in FIG. 11, which illustrates the tappet 12 inverted to one in FIG. 10 to illustrate a position during working. The bottom of the tappet 102 is upwardly placed. The circular tip 107 made of wear resistant metal fits in the engage bore 106, around which a circumferential projection 113 is pressed by a caulking punch 120. On the lower surface of the punch, there are provided a plurality of inverted triangle-sectioned blades 121 on a circle having a diameter larger than that of the engage bore 106. The punch 120 is pressed downwardly, so that the caulking blades 121 push into the upper surface of the top wall 103 of the tappet 102 in FIG. 11. Thus, the circumferential projection 113 around the engage bore 106 is plastically deformed inwardly so as to fix the tip 107.

In the known art, there is a smaller engage area between the circumferential projection 113 around the engage bore 106 and the upper surface(in FIG. 11) of the tip 107, and the circumferential projection 113 has a relatively smaller inward deformation, so that the tip 107 is not sufficiently fixed. If the tip 107 is not sufficiently fixed within the engage bore 106, there is a clearance between the tip 107 and the tappet 102, or the tip 107 and the shaft 111 of the engine valve, which results in clattering during operation, thereby causing one-sided wear. Further if such abnormal movement occurs in the valve operating mechanism, the tip 107 may drop out. To fix the tip 107 firmly, the caulking blade 121 of the punch 120 may be made as large size, thereby providing a large plastic deformation of the engage bore 106. However, in such a case, a crack 114 is liable to be formed at the bottom of a triangle-sectioned groove (hereinafter refer to "caulking groove") on the upper surface of the top wall of the tappet 102. The caulking blade 121 in the known punch 120, for example, comprises a plurality of separate arcs in a circumference as shown in FIG. 12, a bottom view of the punch. In FIG. 12, there are provided six caulking blades 121 the arc of which is subtended over 40 degrees of a central angle at intervals of 20 degrees. The sides of the caulking blade 121 intersect a circumferential portion substantially at a right angle. Accordingly, the sides of the caulking groove in the tappet 102 is formed as a sharp angle as well, so that the crack 114 is liable to be formed.

In order to solve the foregoing disadvantages in the prior are, the object of the present invention is to provide a method of securing a tip in a tappet in an internal combustion engine having high durablity and reliability by increasing caulking force of the tip and fixing the tip in an engage bore of the tappet firmly.

According to one aspect of the present invention, there is provided a method of securing a tip into an engage bore in a top wall of cylindrical tappet body the upper end of which is closed, in an internal combustion engine. comprising the steps of: forming a chamfered portion on the tip at an opening side of the engage bore; and pressing the top wall by a punch having a caulking blade to form a caulking groove around the engage bore and to deform the circumferential projection plastically around the engage bore over the circumferential projection of the tip inwardly.

According to another aspect of the present invention, there is provided a method of securing a tip to a tappet in an internal combustion engine, comprising the steps of: fixing a tip in an engage bore of a top wall in a cylindrical tappet body an upper end of which is closed; and pressing a circumferential projection around the engage bore by a punch having a triangle-sectioned caulking blade which has a concave surface at an inner side to attain plastical deformation of the projection.

According to further aspect of the present invention, there is provided a method of securing a tip to a tappet in an internal combustion engine, comprising the steps of: fitting the tip having a chamfered portion in an engage bore of a top wall of a cylindrical tappet body the upper end of which is closed; and pressing a circumferential projection of the top wall by a punch having a triangle-sectioned caulking blade until an end of the caulking blade reaches to a depth beyond a lower edge of the chamfered portion, thereby making plastical deformation of the projection.

There are advantages of the present invention as follows. The circumferential projection of the top wall of the tappet body is plastically deformed inwardly, and the engaged area between tile tip and the engage bore is increased. Therefore, caulking force of the tip is increased and the tip is firmly fixed in the engage bore. If the chamfered portion is formed on the tip, the contact area between the circumferential projection around the engage bore and the tip becomes larger and adhesiveness is increased, so that the tip is more firmly fixed.

BRIEF DESCRIPTION OF THE DRAWINGS

The foregoing and other advantages and features of this invention will become more clear based on the following description with respect to drawings wherein.

PREFERRED EMBODIMENTS OF THE INVENTION

Figure 1A:
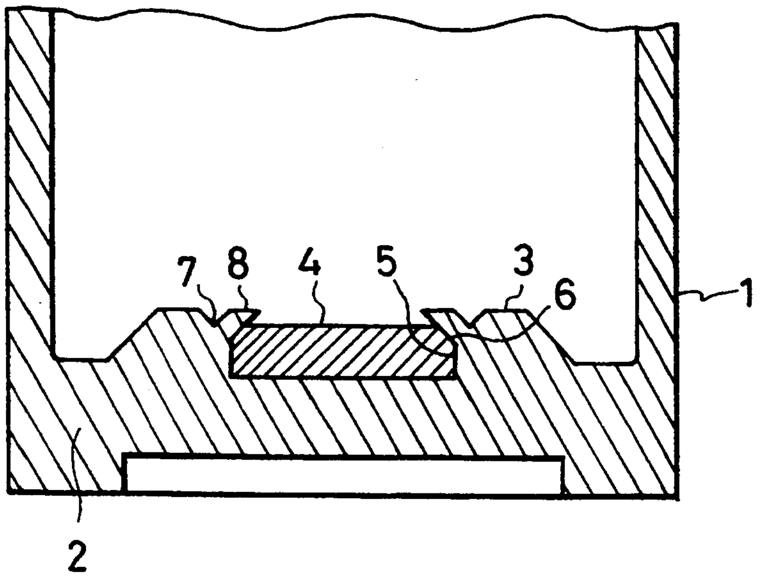
FIG. 1A is a longitudinal sectional front view of one embodiment of a tappet for an internal combustion engine according to the present invention in which a tip is provided.
Figure 1B:
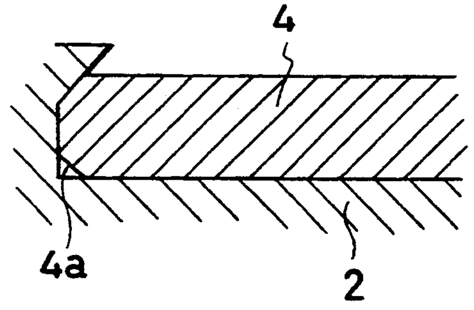
FIG. 1B is a side view which illustrates another embodiment of the tip.
Figure 2:
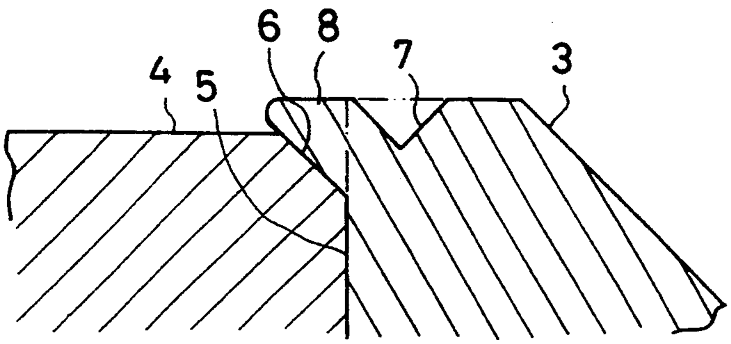
FIG. 2 is an enlarged sectional view of a main part in FIG. 1.

As shown in FIGS. 1A, 1B and 2, an aluminium alloy tappet 1 comprises a cylinder in which the upper end is closed by a top wall 2. When the tappet 1 is worked, the tappet body 1 is inverted as shown in FIG. 1A; so the top and bottom of the tappet will be hereinafter mentioned with respect to FIG. 1A. There is provided a thickened portion 3 on the upper surface of the top wall 2 of the tappet body 1 and coaxial with the body 1. Within the thickened portion 3, there is provided an engage bore 5 in which a tip 4 is to be fitted. The tip 4 is formed as a disc made of wear resistant metal having a chamfered portion 6 at its upper surface.

Figure 11:
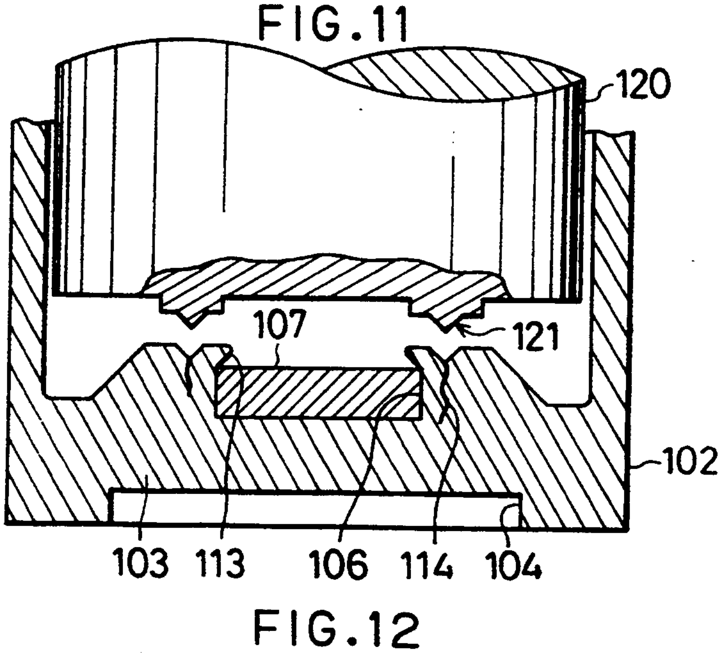
FIG. 11 is a longitudinal sectional view which illustrates a known caulking method.

Before the following caulking process, the engage bore 5 is cylindrical as shown by a two-dotted line in FIG. 2 so that the tip 4 may fit in the engage bore 5. After the tip 4 fits in the engage bore 5, a caulking blade is pressed on the upper surface of the thickened portion 3 around the engage bore 5 by the known punch of FIG. 11. On the upper surface of the thickened portion 3, there is formed a triangle-sectioned groove 7, so that an upper circumferential projection 8 around the engage bore 5 is plastically deformed in an inward direction. Since a chamfered portion 6 is formed on the upper surface of the tip 4, the upper projection 8 is deformed over an inclined surface of the chamfered portion 6. Thus, compared with a known method having no chamfered portion, the contact area between the upper projection 8 and the tip 4 is increased, thereby causing larger holding force and keeping the tip 4 stable and strong even if pressing force by the caulking blade is relatively smaller.

The chamfered portion 6 may be preferably formed on both upper and lower surfaces of the tip 4 as shown in FIG. 1B. Thus, when the tip 4 is inserted into the engage bore 5, it will not be necessary to discriminate which is the top or bottom of the tip 4, thereby increasing working efficiency.

Figure 3:
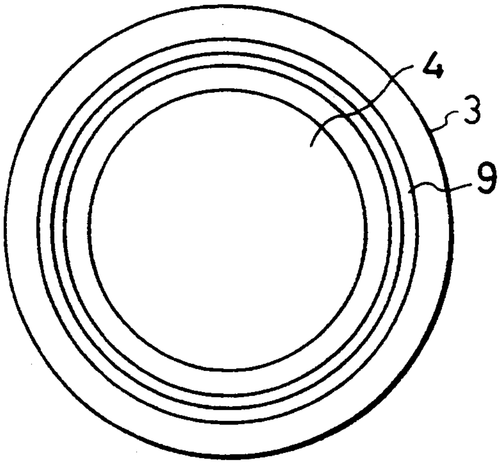
FIG. 3 is a top plan view of one embodiment of a tip engage portion formed by pressing in the above embodiment.
Figure 4:
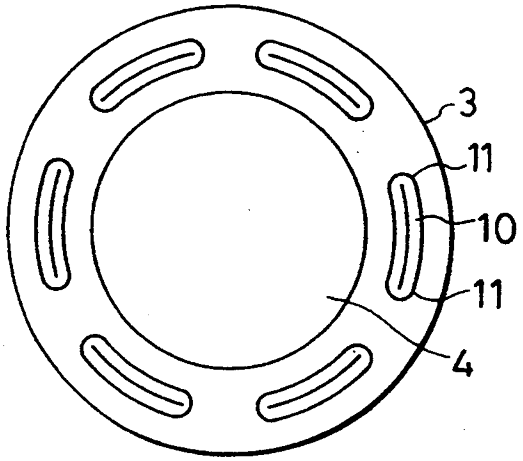
FIG. 4 is a top plan view of another embodiment of a tip engage portion formed by pressing in the same embodiment.

FIGS. 3 and 4 are top plan views which illustrate different embodiments of the tip engage portion after it is formed by pressing with the caulking blade. FIG. 3 shows a groove formed by a punch having a continuous circular caulking blade. In this case, there is no corner which generates a crack, so that cracking is prevented during working. The upper projection 8 of the engage bore 5 to be deformed over the chamfered portion 6 of the tip 4 is equally formed over the whole circumference, thereby keeping the tip 4 firmly and strongly.

Figure 12:
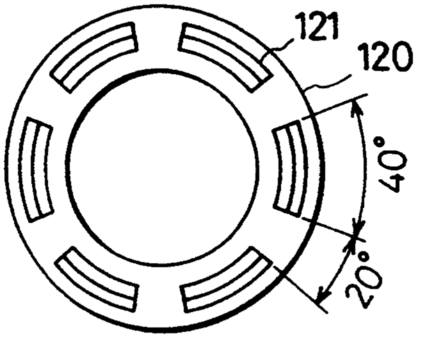
FIG. 12 is a bottom view of a known punch for forming caulking grooves.

In FIG. 4, with a punch having a plurality of separate arcuate caulking blades, there are formed a plurality of arcuate grooves 10 the sides of which are formed as a semicircular or semi-elliptical surface. In this case, there is no sharp corner as a known example in FIG. 12, and no cracking can be generated by pressing. Further, in FIG. 4, pressing force in working is smaller than that in the circular caulking groove 9, so that lighter and smaller pressing means for deforming the upper projection 8 could be provided.

Figure 5:
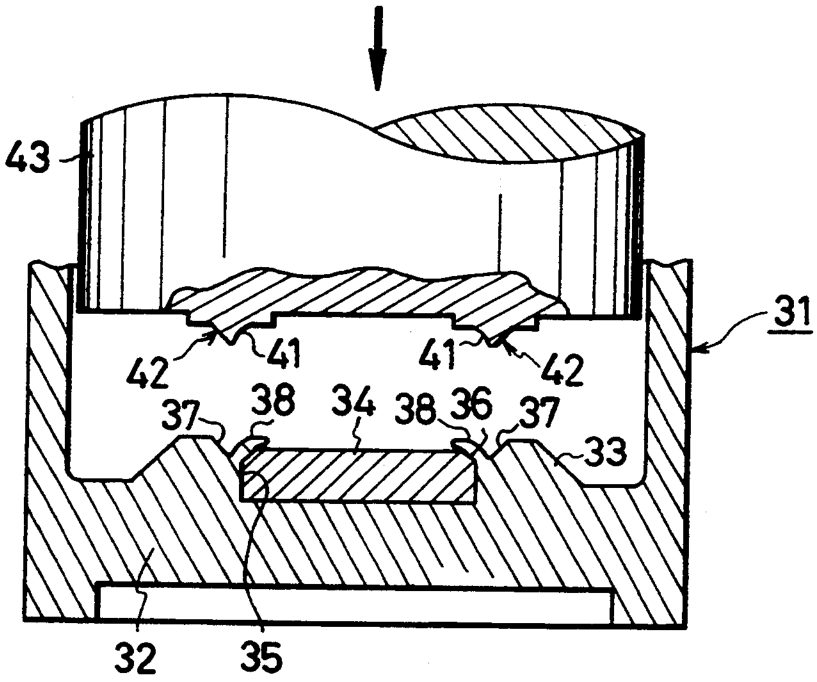
FIG. 5 is a longitudinal sectional view which shows another embodiment of a tappet according to the present invention.
Figure 6:
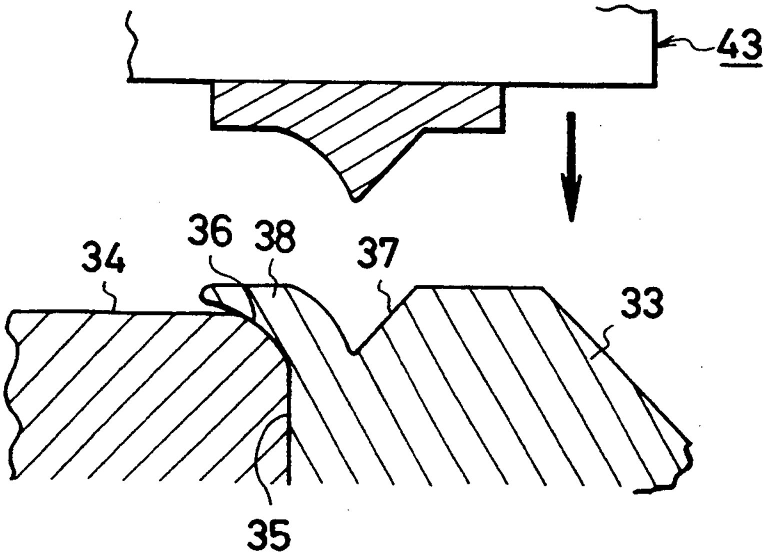
FIG. 6 is a partial sectional view of a main part in FIG. 5 in further embodiment of the present invention

FIGS. 5 and 6 illustrate an embodiment in which increased caulking force makes a tip 34 fixed firmly in an engage bore 35, similar to FIGS. 1A and 2. A tappet body 1 is closed by a top wall 32 at the end. In FIG. 5, the tip 34 is made of wear resistant metal formed as a disc in which its thickness is slightly smaller than the depth of the engage bore 35, and a chamfered portion 36 is formed at angle of 45 degrees.

The tip 34 will be fitted in the engage bore 35 as follows. Firstly, as shown in FIG. 5, into the engage bore 35 of the inverted tappet body 31 is fitted the tip 34 having the chamfered portion 36 at the upper surface. Then, the upper surface of a thickened portion 33 is strongly pressed by a punch 43 having on its lower surface an inverted isosceles triangle sectioned caulking blade 42 in which an inner concaved surface 41 is formed. On the thickened portion 33, an annular groove 37 corresponding to the caulking blade 42 is formed, and at the same time, an upper projection 38 of the engage bore 35 is plastically deformed inwardly over the chamfered portion 36 of the tip 34, so that the tip 34 is caulked. Preferably, the tip end of the caulking blade 42 may be slightly rounded to prevent stress concentration to the bottom of the groove 37.

By caulking the tip 34 as above, the concaved surface 41 of the caulking blade 42 makes the upper projection of the engage bore 35 smoothly deformed. thereby increasing inward plastical deformation rate. Thus, the contact area between the upper projection 38 and the tip 34 is increased, whereby the chamfered portion 36 is strongly pressed onto the inner surface of the upper projection 38. As a result, by increasing pressing or caulking force of the tip 34 into the engage bore 35, the tip 34 is firmly fixed within the engage bore 35.

FIG. 6 illustrates further embodiment of the present invention, in which the chamfered portion 36 is formed as a convexed surface. Accordingly, the material contents are smoothly flown, thereby increasing adherence between the chamfered portion 36 and the upper projection 38 and acting pressing load onto the whole chamfered portion effectively. Thus, caulking force is further increased, so that force for removing the tip 34 from the tappet body is increased. In the embodiment, the tip 34 is continuously caulked, but a plurality of points around the tip 34 may be caulked by a punch 43 which comprises a plurality of separate caulking blades 42.

Figure 7:
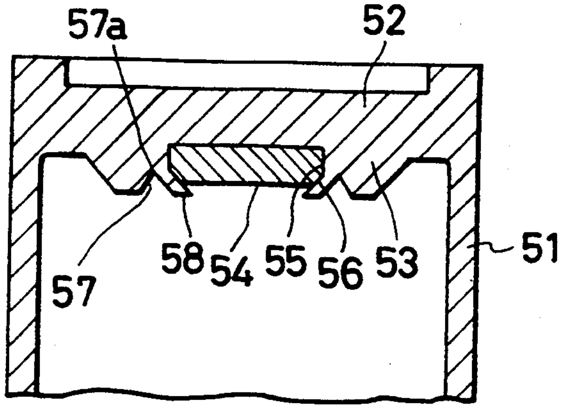
FIG. 7 is a longitudinal sectional view of yet another embodiment of a tappet according to the present invention in which a tip is mounted.
Figure 8:
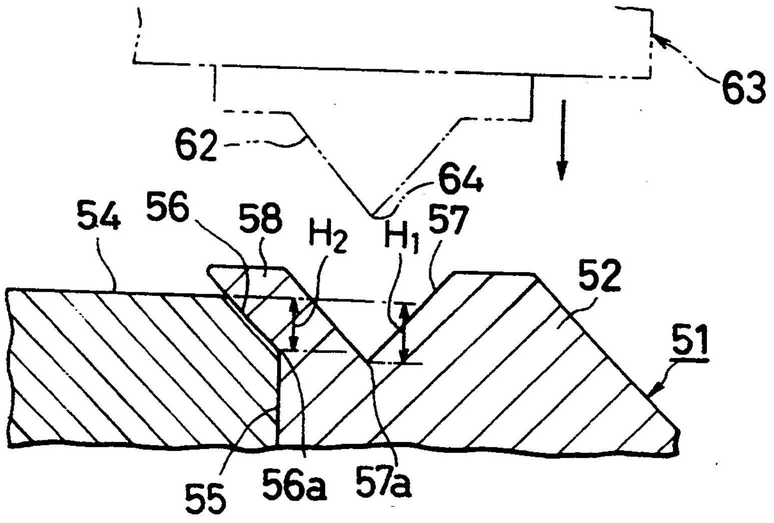
FIG. 8 is an enlarged partial sectional view of in which the tappet in FIG. 7 is inverted.
Figure 9:
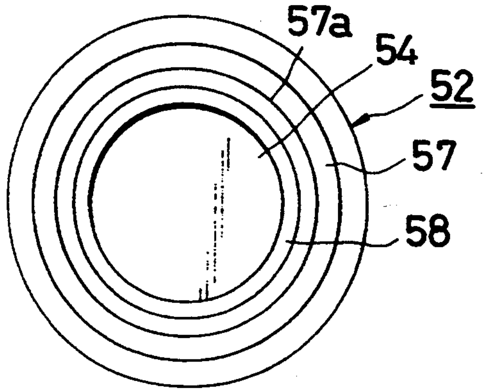
FIG. 9 is a bottom plan view of FIG. 7.
Figure 10:
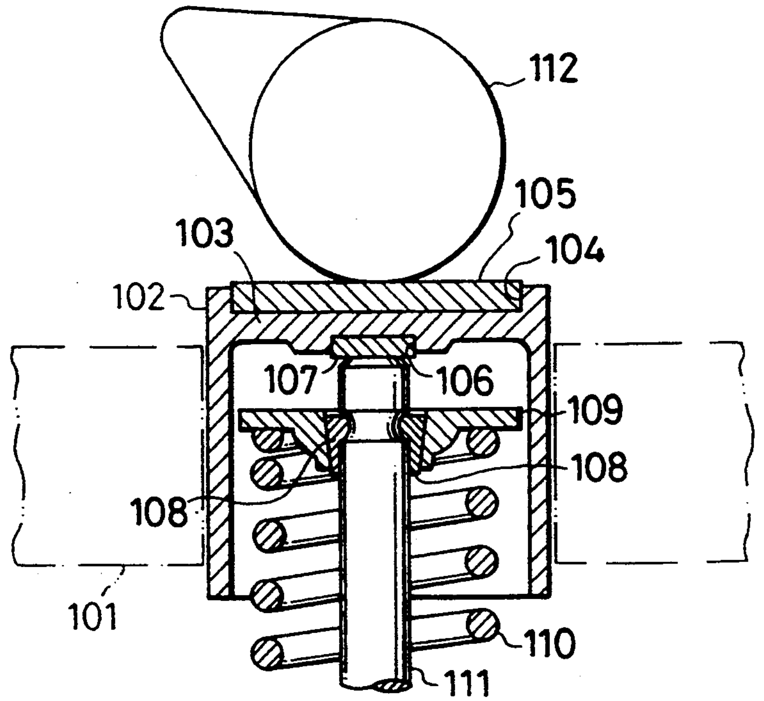
FIG. 10 is a central longitudinal sectioned front view of a known tappet in a direct-acting valve operating mechanism.

FIGS. 7 and 8 illustrate an embodiment for increasing caulking force of a tip 54 and are similar to FIGS. 1A and 2. A tappet body 51 is closed by a top wall 52 at the end. The tip 54 is formed as a disc in which its thickness is slightly smaller than the depth of an engage bore 55 and its lower outer circumference has a chamfered portion 56 at an angle of about 45 degrees. As shown in FIG. 8, in an inverted tappet body 51, the tip 54 fits in the engage bore 55, and, then, the upper surface of the thickened portion 53 is strongly pressed by a punch 63 which comprises at the lower surface a circular caulking blade 62 having an inverted isosceles triangle section intersected at a right angle. Accordingly, on the upper surface of the thickened portion 53, there is formed an inverted triangle-sectioned groove 57 corresponding to the caulking blade 62, so that an upper projection 58 of the engage bore 55 is plastically deformed inwardly over a whole circumference.

Meanwhile, the stroke of the punch 63 is determined so that the tip end of the caulking blade 62 may reach to the depth beyond the lower edge 56*a* of the chamfered portion 56 of the tip 54, or so that the height "$H_1$" between the bottom 57*a* of the groove 57 and the upper surface of the tip 54 may be slightly larger than the height "$H_2$" of the chamfered poriton 56. In order not to concentrate stress to the bottom 57*a* of the groove 57, preferably, the tip end 64 of the caulking blade 62 may be slightly rounded. Thus, caulking of the tip 54 increases the contact area between the upper projection 58 and the tip 54, and the starting point of the upper projection 58 is lower than the lower edge 56*a* of the chamfered portion 56, so that inward plastical deformation is increased and a large pressing load acts over the whole surface and the lower portion of the chamfered portion 56. Thus, caulking or fastening force of the tip 54 is increased and the tip 54 is firmly fixed in the engage bore 55. Instead of caulking the whole circumference of the tip 54 into a circular form, several points may be preferably caulked with a punch 63 which has a plurality of separate caulking blades 62. The tip 54 is not limited to a circular form, but may be elliptical or other form.

To determine strength of the caulking force, it is generally carried out to measure relative rotary force or rotary torque between the tip engage portion (tappet body) and the tip, and the applicant confirms that significant larger slip torque is available compared with a known tappet when the tip is caulked by the forgoing method.

The foregoing merely relate to embodiments of the present invention. Various changes and modifications may be made by person skilled in the art without departing from the scope of claims wherein:

What is claimed is:

1. A method of securing a tip having upper and lower surfaces in an engage bore having a closed lower end and an open upper end, the engage bore being disposed in a top wall of a cylindrical tappet body in an internal combustion engine, an upper end of the tappet body being closed, the method comprising the steps of:

forming a chamfer on a periphery of the upper surface of the tip;

inserting the tip in the engage bore with the chamfer adjacent to the open end of the engage bore;

pressing the top wall with a punch having a caulking blade so as to form a caulking groove around the open end of the engage bore and thereby plastically deforming a portion of the top wall disposed between the caulking groove and the engage bore such that the deformed portion of the top wall forms a circumferential projection extending radially inward over the open end of the engage bore and the chamfer on the tip so as to secure the tip from movement within the engage bore.

2. The method of claim 1 further comprising forming a chamfer on a periphery of the lower surface of the tip.

3. The method of claim 1 wherein the chamfer is formed entirely around the periphery of the upper surface of the tip and the caulking groove is formed so as to extend continuously and completely around the engage bore.

4. The method of claim 1 wherein the caulking groove comprises a plurality of separate arcuate grooves which are arranged around the engage bore, each groove having arcuate ends.

5. A method of securing a tip into a tappet in an internal combustion engine, comprising the steps of:

fixing a tip into an engage bore disposed in a top wall of a cylindrical tappet body having a closed upper end; and pressing the top wall with a punch having a triangle-sectioned caulking blade with a concave inwardly facing surface to form a caulking groove and thereby plastically deforming a portion of the top wall disposed between the caulking groove and the engage bore such that the deformed portion of the top wall forms a circumferential projection extending radially inward over the engage bore and the chamfer on the tip.

6. The method of claim 5 wherein the tip has a chamfer on an upper surface of the tip and the tip is inserted in the engage bore with the chamfer adjacent to an open end of the engage bore.

7. The method of claim 5 wherein the tip has an upper surface having a rounded peripheral edge that is positioned adjacent an open end of the engage bore upon completion of the fixing step.

8. A method of securing a tip to a tappet in an internal combustion engine, comprising the steps of:

fitting the tip having a chamfered portion into an engage bore of a top wall of a cylindrical tappet body having a closed upper end; and pressing the top wall with a punch having a triangle-sectioned caulking blade until one end of the caulking blade extends deeper into the a top wall than the chamfered portion of the tip fitted into the engage bore and thereby plastically deforming a portion of top wall disposed between the caulking blade and the engage bore such that the deformed portion of the top wall forms a circumferential projection extending radially inward over the engage bore and the chamfer on the tip.

* * * * *